(12) United States Patent
Motoyama

(10) Patent No.: US 11,301,182 B2
(45) Date of Patent: Apr. 12, 2022

(54) CONTROL APPARATUS, IMAGE FORMING APPARATUS, INFORMATION PROCESSING APPARATUS, CONTROL METHOD, AND STORAGE MEDIUM FOR PREDICTING POSSIBILITY OF MALFUNCTION

(71) Applicant: CANON KABUSHIKI KAISHA, Tokyo (JP)

(72) Inventor: Masanao Motoyama, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/923,504

(22) Filed: Jul. 8, 2020

(65) Prior Publication Data

US 2021/0011670 A1    Jan. 14, 2021

(30) Foreign Application Priority Data

Jul. 11, 2019    (JP) .............................. JP2019-129375

(51) Int. Cl.
*G06F 3/12*    (2006.01)
(52) U.S. Cl.
CPC .............. *G06F 3/122* (2013.01); *G06F 3/121* (2013.01); *G06F 3/1251* (2013.01)
(58) Field of Classification Search
CPC ......... G06F 3/122; G06F 3/121; G06F 3/1251
USPC ........................................................ 358/1.14
See application file for complete search history.

(56) References Cited

U.S. PATENT DOCUMENTS

| 2001/0015818 | A1* | 8/2001 | Kawanabe | ........... | G06K 15/102 |
| | | | | | 358/1.15 |
| 2002/0075505 | A1* | 6/2002 | Murray | ................. | G06F 3/1208 |
| | | | | | 358/1.15 |
| 2006/0203027 | A1* | 9/2006 | Espasa | ................. | B41J 2/04563 |
| | | | | | 347/17 |
| 2012/0050755 | A1* | 3/2012 | Chandu | ................ | H04N 1/6033 |
| | | | | | 358/1.9 |
| 2017/0153564 | A1* | 6/2017 | Kanaya | .............. | G03G 15/0266 |
| 2018/0246453 | A1* | 8/2018 | Hirose | ............... | G03G 15/5062 |
| 2020/0013158 | A1* | 1/2020 | Asai | ...................... | G06T 7/0002 |

FOREIGN PATENT DOCUMENTS

WO    0188624 A1    11/2001

* cited by examiner

*Primary Examiner* — Allen H Nguyen
(74) *Attorney, Agent, or Firm* — Carter, DeLuca & Farrell LLP

(57) ABSTRACT

A control apparatus includes: an acquisition unit configured to acquire measurement data in continuous printing in which print images corresponding to a plurality of pages generated based on print data are continuously printed, the measurement data being data obtained by measuring a status of an image forming apparatus while the image forming apparatus is printing a print image for at least one measurement target page out of the plurality of pages without using a rest of the plurality of pages as measurement target pages; and a prediction unit configured to perform processing of predicting a possibility of a malfunction of the image forming apparatus using the measurement data.

20 Claims, 14 Drawing Sheets

CONTROL APPARATUS, IMAGE FORMING APPARATUS, INFORMATION PROCESSING APPARATUS, CONTROL METHOD, AND STORAGE MEDIUM FOR PREDICTING POSSIBILITY OF MALFUNCTION

BACKGROUND OF THE INVENTION

Field of the Invention

The present disclosure relates to a technique of malfunction prediction in an image forming apparatus.

Description of the Related Art

There is a technique of predicting a malfunction of an image forming apparatus that prints an image on a print medium. International Publication No. WO 01/088624 discloses a technique of acquiring data indicating the status of an apparatus, the data being classified into a high frequency data set and a low frequency data set. The high frequency data is acquired each time printing is performed and is used to estimate the cause of a malfunction of the apparatus. The low frequency data is acquired each time a setup is performed and is used to predict the end-of-life for a consumable or component.

However, in the case of acquiring measurement data each time printing is performed and performing processing for malfunction prediction using the measurement data, there is a possibility of increase in a processing load for acquiring the measurement data and a processing load for predicting using the measurement data.

SUMMARY OF THE INVENTION

A control apparatus according to the present disclosure comprises: an acquisition unit configured to acquire measurement data in continuous printing in which print images corresponding to a plurality of pages generated based on print data are continuously printed, the measurement data being data obtained by measuring a status of an image forming apparatus while the image forming apparatus is printing a print image for at least one measurement target page out of the plurality of pages without using a rest of the plurality of pages as measurement target pages; and a prediction unit configured to perform processing of predicting a possibility of a malfunction of the image forming apparatus using the measurement data.

Further features of the present invention will become apparent from the following description of exemplary embodiments with reference to the attached drawings.

DESCRIPTION OF THE EMBODIMENTS

First Embodiment

The embodiment will be described in detail with reference to the drawings. It should be noted that the embodiment described below does not limit the present disclosure and that not all combinations of features described in the present embodiment are essential.

[System Configuration and Configuration of Image Forming Apparatus]

Figure 1:
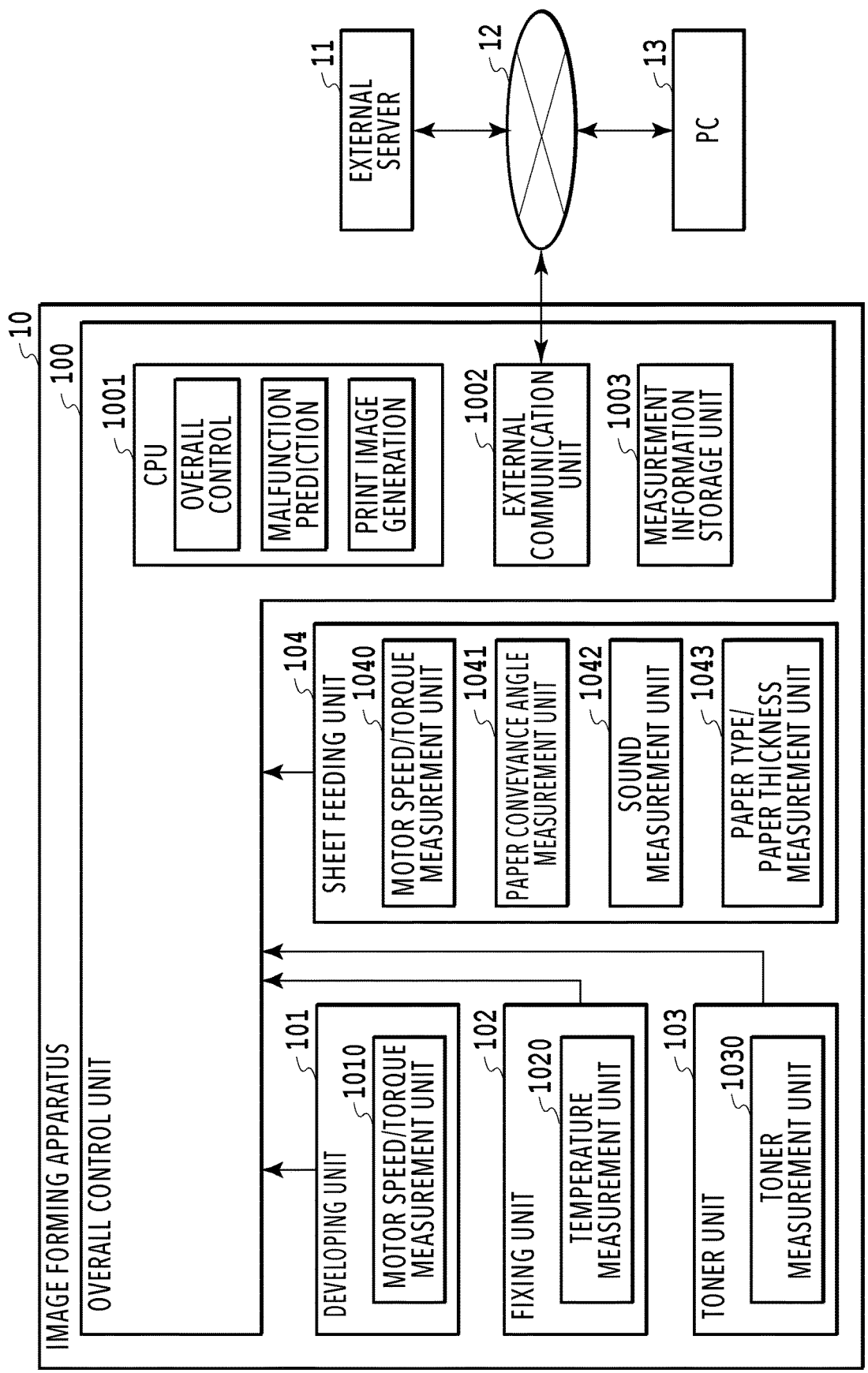
FIG. 1 is a diagram showing a configuration example of a control system.

FIG. 1 is a diagram showing a configuration of a control system of the present embodiment. The control system comprises an image forming apparatus 10, an external server 11, a PC 13, and a network 12 connecting them.

The external server 11 is a management apparatus that remotely manages devices via the network. The external server comprises, for example, a CPU, a ROM, a RAM, and an HDD (hard disk drive). Each of the functions of the external server 11 is controlled by the CPU loading a computer program and data stored in the ROM or HDD into the RAM and executing the program.

The external server 11 is a server installed in, for example, a service center. The external server 11 acquires, from a plurality of image forming apparatuses connected to the network 12, malfunction prediction information on the image forming apparatuses, and makes a predetermined notification in a case where an image forming apparatus has a high possibility of a malfunction. For example, the external server 11 notifies a serviceman or user of a portion having the possibility of a malfunction. Accordingly, the serviceman or user can be prompted to perform maintenance of the image forming apparatus having the high possibility of a malfunction. In a case where the image forming apparatus has a high possibility of a malfunction, the predetermined notification may be made by an overall control unit 100 of the image forming apparatus, which will be described later.

The PC (personal computer) 13 is an information processing apparatus comprising a CPU, a ROM, a RAM, and an HDD. For example, the operation of each of the functions of the PC 13 is controlled by the CPU loading a computer program and data stored in the ROM or HDD into the RAM and executing the program. The computer program includes a printer driver of the image forming apparatus 10. The PC 13 generates a print job including a print command and print data. The print job is transmitted to the image forming apparatus 10 by an external communication unit (not shown) of the PC 13 via the network 12.

The image forming apparatus 10 comprises the overall control unit 100, a developing unit 101, a fixing unit 102, a toner unit 103, and a sheet feeding unit 104. The image forming apparatus 10 is, for example, a laser beam printer. The following description is based on the assumption that the image forming apparatus 10 is a laser beam printer.

The overall control unit 100 comprises a CPU 1001, an external communication unit 1002, and a measurement information storage unit 1003. The overall control unit 100 is a control apparatus that performs overall control of the image forming apparatus 10.

In the present embodiment, the CPU 1001 performs overall control, print image generation, and malfunction prediction. The CPU 1001 monitors and controls the developing unit 101, the fixing unit 102, the toner unit 103, and the sheet feeding unit 104 so as to implement an image forming process such as development, fixation, toner supply, and sheet feeding.

The CPU 1001 also stores measurement data, which is a result of measurement by each measurement unit of the image forming unit to be described later, in the measurement information storage unit 1003 and manages the data. The measurement information storage unit 1003 may be a storage area dedicated to storage of the measurement data or may be a part of a storage area such as a large capacity DRAM or SRAM allocated by the CPU 1001.

In the case of allocating a part of a DRAM or SRAM to the measurement information storage unit 1003, the CPU 1001 may dynamically secure a storage area for the measurement information storage unit 1003 in the DRAM or SRAM before the measurement data is stored. This enables an effective use of a memory area freed by the CPU 1001 after print image generation. In addition, the capacity of the DRAM or SRAM in the entire image forming apparatus 10 can be reduced.

The external communication unit 1002 communicates with the external server 11 via the network 12 and transmits a result of prediction to the external server 11. The measurement information storage unit 1003 receives an instruction from the CPU 1001 and stores information measured by measurement units of image forming units 101 to 104.

The developing unit 101, the fixing unit 102, the toner unit 103, and the sheet feeding unit 104 are units for implementing an image forming process including development, fixation, toner supply, and sheet feeding. The developing unit 101, the fixing unit 102, the toner unit 103, and the sheet feeding unit 104 will also be referred to as image forming units 101 to 104.

The developing unit 101 is a unit for implementing a developing step in the image forming process based on an instruction from the CPU 1001. The developing unit 101 comprises a motor speed/torque measurement unit 1010. The motor speed/torque measurement unit 1010 measures the speed and torque of a photosensitive drum driving motor provided inside the developing unit 101 based on an instruction from the CPU 1001 and sends measurement data, which is a result of measurement, to the measurement information storage unit 1003.

The fixing unit 102 is a unit for implementing a fixing step in the image forming process. The fixing unit 102 comprises a temperature measurement unit 1020 therein. The temperature measurement unit 1020 measures the temperature of fixing equipment in the fixing unit based on an instruction from the CPU 1001 and sends measurement data, which is a result of measurement, to the measurement information storage unit 1003.

The toner unit 103 is a unit that supplies toner on a charged photosensitive drum in the developing step in the image forming process. The toner unit 103 comprises a toner measurement unit 1030. The toner measurement unit 1030 measures the remaining amount of toner based on an instruction from the CPU 1001 and sends measurement data, which is a result of measurement, to the measurement information storage unit 1003.

The sheet feeding unit 104 is a unit for implementing sheet feeding and conveyance in the image forming process. The sheet feeding unit 104 comprises a motor speed/torque measurement unit 1040 which measures the speed and torque of an internal motor. The sheet feeding unit 104 further comprises a paper conveyance angle measurement unit 1041 which measures the angle of a sheet at the time of sheet conveyance, a sound measurement unit 1042 which measures sound, and a paper type/paper thickness measurement unit 1043 which measures a paper type and paper thickness. Each of the measurement units 1040 to 1043 of the sheet feeding unit 104 performs measurement based on an instruction from the CPU 1001 and sends measurement data, which is a result of measurement, to the measurement information storage unit 1003. This is the end of description of the configuration of the control system. It should be noted that the configuration of the control system and the configuration of the image forming apparatus are not limited to those described above.

[Functional Configuration]

Figure 2:
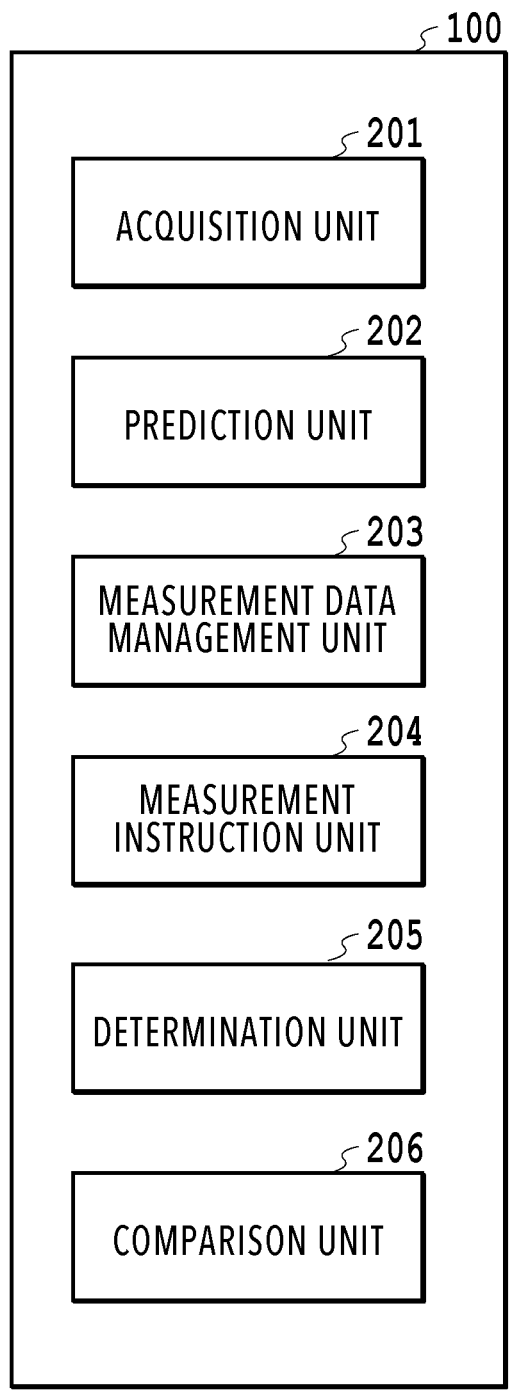
FIG. 2 is a diagram showing an example of a configuration of an image forming apparatus.

FIG. 2 is a diagram showing an example of a functional configuration for malfunction prediction in the overall control unit 100. The overall control unit 100 comprises an acquisition unit 201, a prediction unit 202, a measurement data management unit 203, a measurement instruction unit 204, a determination unit 205, and a comparison unit 206. The acquisition unit 201 acquires, for example, measurement data obtained by measuring the status of the image forming apparatus 10 at the time of printing, that is, a result of measurement by each of the measurement units of the image forming units 101 to 104.

The prediction unit 202 performs malfunction prediction processing of predicting a possibility of a malfunction of the image forming apparatus using the measurement data. In the malfunction prediction performed by the prediction unit 202, it is predicted whether the image forming apparatus malfunctions within a certain period, or how high the possibility of a malfunction of the image forming apparatus within a certain period is. The prediction unit 202 may perform malfunction prediction processing by any method. For example, based on information indicating a time-series difference between the measurement value and control value of the motor speed or torque, a time at which the difference between the measurement value and control value is out of a normal range is predicted as a time at which there is a possibility of a malfunction. The prediction unit 202 may perform malfunction prediction using measurement data measured by any one of the measurement units of the image forming units 101 to 104. Alternatively, malfunction prediction may be performed using a malfunction prediction model obtained by machine learning based on each measurement data, or performed based on statistical processing, a comparison computation with a threshold, or the like.

The measurement data management unit 203 manages measurement data. The measurement instruction unit 204 instructs each of the measurement units of the image forming units 101 to 104 to measure the status of the image forming apparatus 10 at the time of printing.

The determination unit 205 determines a page to be a measurement target (measurement target page) from among a plurality of pages for which continuous printing is performed. The comparison unit 206 compares settings of two print jobs. The determination unit 205 and the comparison unit 206 function in the embodiments described later (the determination unit 205 functions in the fourth and fifth embodiments and the comparison unit 206 functions in the eighth embodiment). Thus, the determination unit 205 and the comparison unit 206 may be omitted in the present embodiment.

The function of each unit in FIG. 2 is implemented by the CPU loading a program code stored in the ROM into the RAM and executing the code. Alternatively, some or all of the functions of the units in FIG. 2 may be implemented by hardware such as an ASIC or an electronic circuit.

[Timing of Processing for Malfunction Prediction]

Figure 3:
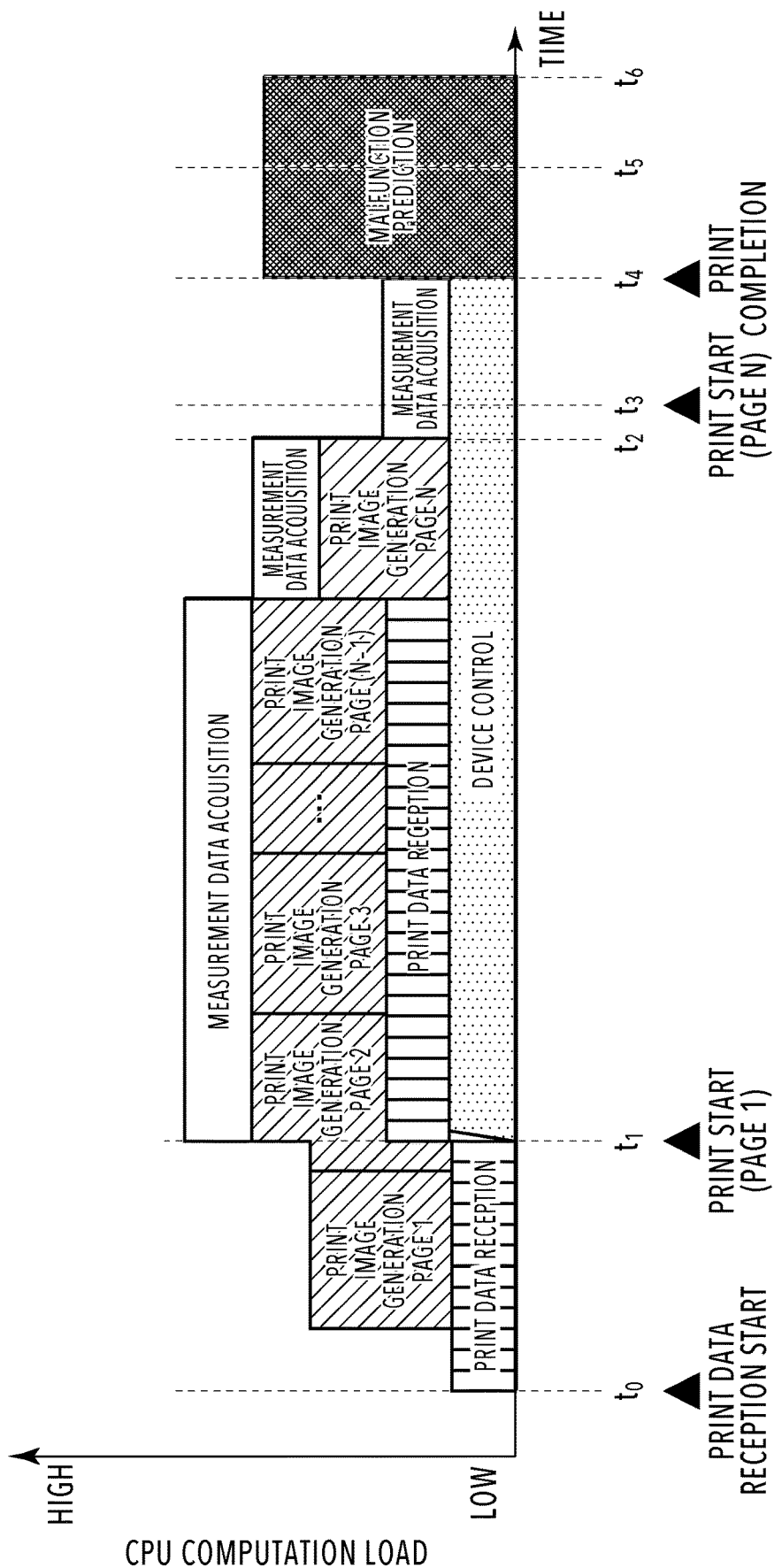
FIG. 3 is a diagram showing a time-series CPU load at the time of continuous printing in a comparative example.
Figure 4:
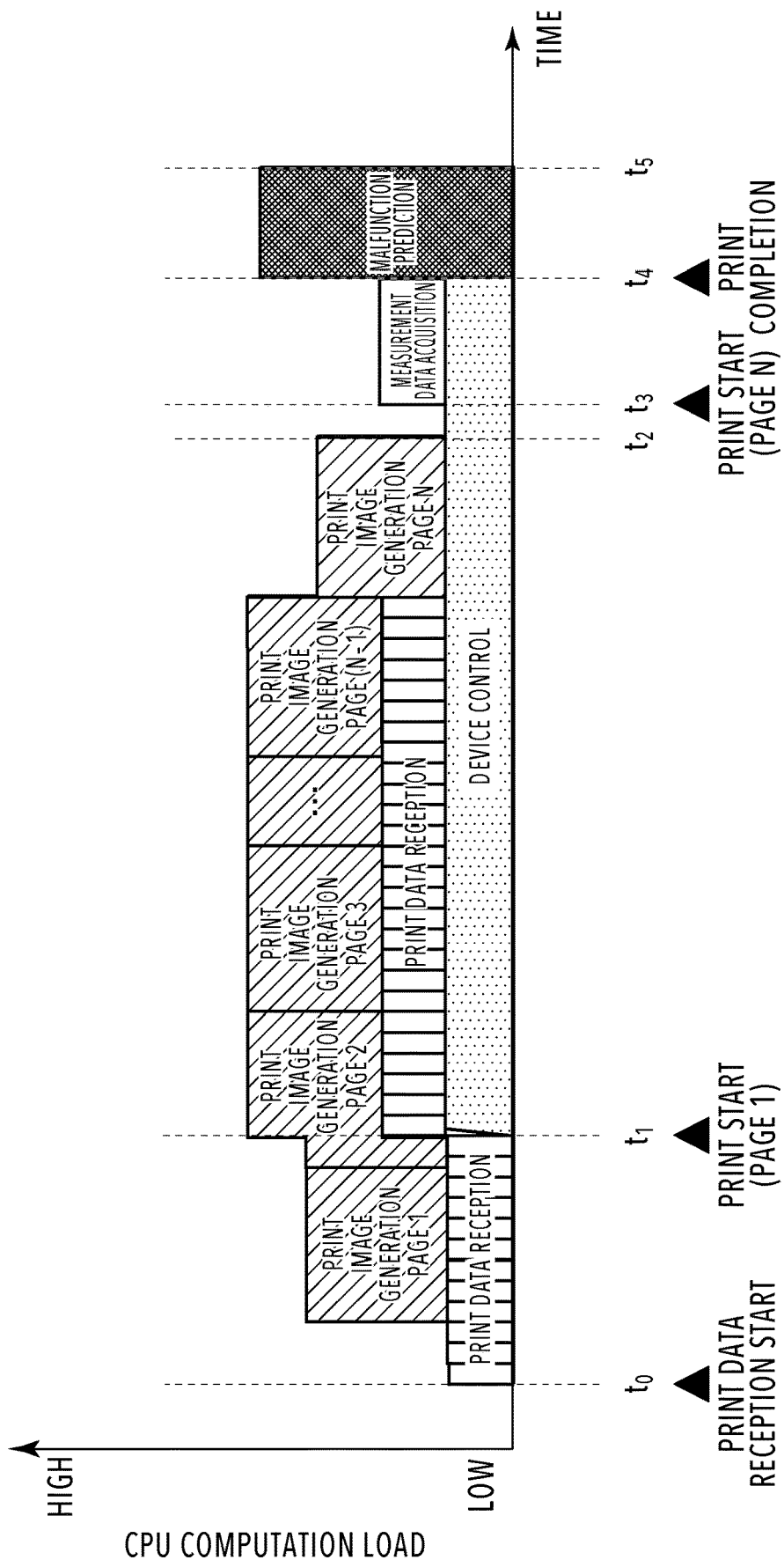
FIG. 4 is a diagram showing a time-series CPU load in continuous printing.

Next, a description will be given of a timing of acquisition of measurement data for malfunction prediction and a timing of a computation for malfunction prediction. In FIG. 3 and FIG. 4, the horizontal axis represents time and the vertical axis represents a computation load of the CPU 1001 of the overall control unit 100 at each time in the case of performing continuous printing for continuously printing a plurality of pages. FIG. 3 and FIG. 4 show the computation load of the CPU 1001 in the case of performing continuous printing of N pages (N is a natural number excluding zero).

In FIG. 3 and FIG. 4, time $t_0$ is a time at which the overall control unit 100 starts receiving print data from the network 12. At time $t_0$, the overall control unit 100 starts interpreting the received print data and generating print images corresponding to the pages, which are images to be printed on print media. After a print image for the first page is generated at time $t_1$, the overall control unit 100 controls other units and starts printing the print image for the first page.

After printing is started, the overall control unit 100 controls the image forming units 101 to 104 to perform operation for printing the print image while receiving print data for subsequent pages and generating print images. At time $t_2$, the overall control unit 100 finishes generating a print image for the last Nth page. After that, at time $t_3$, the overall control unit 100 performs control for starting printing the last Nth page.

With reference to FIG. 3, a description will be given of a comparative example of measuring the status of the image forming apparatus 10 for malfunction prediction, acquiring the measurement data, and performing malfunction prediction during printing of all pages for continuous printing. In the comparative example, as shown in FIG. 3, the status of the image forming apparatus 10 is measured for all the pages. Thus, a load for acquiring measurement data occurs from time $t_1$, the start time of printing of the print image for the first page, to time $t_4$, the completion time of printing of the print image for the last page. Further, since the measurement data is stored in the measurement information storage unit 1003 until the completion of printing of all the pages, the amount of data stored becomes large. Moreover, since the amount of measurement data used for malfunction prediction becomes large, a computation load for malfunction prediction also increases. Therefore, it is necessary to perform effective prediction while suppressing increase in data amount and computation load.

FIG. 4 is a diagram showing a computation load of the CPU 1001 in the present embodiment. In the present embodiment, the status of the image forming apparatus 10 is not measured before printing of the last Nth page. From time $t_3$, the start time of printing of the last Nth page, the measurement instruction unit 204 instructs the measurement units of the image forming units 101 to 104 to perform measurement. The image forming units 101 to 104 perform measurement concurrently with processing of printing the Nth page and transmit measurement data to the overall control unit 100. The acquisition unit 201 acquires the measurement data from the image forming units 101 to 104. The measurement data management unit 203 stores the measurement data in the measurement information storage unit 1003. From time $t_4$, the time of completion of printing of the Nth page and acquisition of the measurement data, a number of CPU resources are allocated to malfunction prediction, whereby the prediction unit 202 can perform malfunction prediction using the measurement data at the time of printing of the Nth page.

In this manner, in the present embodiment, the measurement instruction unit 204 causes the measurement units of the image forming units 101 to 104 to measure the status of the image forming apparatus 10 for malfunction prediction only during printing of the last page for continuous printing. Since the instruction to measure data for malfunction prediction and the acquisition of the data are limited to the last page, effective prediction can be performed while suppressing increase in data amount and computation load for malfunction prediction. In addition, since the last page is used as a measurement target page, malfunction prediction can be performed using the latest measurement data.

[Flowchart]

Figure 5:
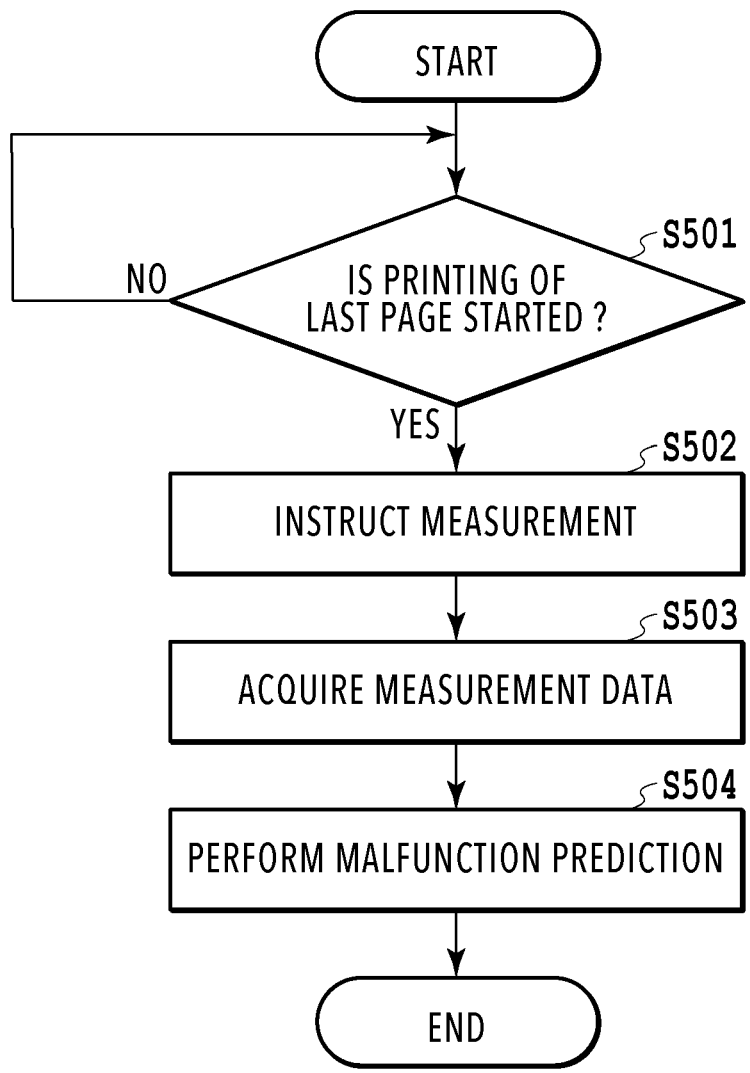
FIG. 5 is a flowchart showing processing of malfunction prediction.

FIG. 5 is a flowchart showing a series of processing for malfunction prediction of the overall control unit 100 in the present embodiment. The series of processing shown in the flowchart of FIG. 5 is performed by the CPU of the overall control unit loading a program code stored in the ROM into the RAM and executing the code. Some or all of the functions of the steps in FIG. 5 may be implemented by hardware such as an ASIC or an electronic circuit. In the description of the processing, sign "S" indicates a step in the flowchart, which also applies to the subsequent flowcharts. The flowchart of FIG. 5 shows the processing for malfunction prediction after the image forming apparatus 10 starts continuous printing of N pages.

In S501, it is determined whether printing of the Nth page is started, the Nth page being the last page of a plurality of pages for which continuous printing is performed. If printing of the last page is started, the processing proceeds to S502. In S502, the measurement instruction unit 204 instructs each of the measurement units of the image forming units 101 to 104 to measure the status of the image forming apparatus 10 during printing of the last page. According to the instruction, each measurement unit measures the status of the image forming apparatus 10.

In S503, the acquisition unit 201 acquires measurement data, which is a result of measurement by the measurement units of the image forming units 101 to 104. The measurement data management unit 203 stores the measurement data in the measurement information storage unit 1003 as data for malfunction prediction. In S504, after measurement data at the time of printing of the last page is completely acquired, the prediction unit 202 performs malfunction prediction using the measurement data at the time of printing of the last page.

As described above, in the present embodiment, the storage of data necessary for malfunction prediction is limited to the last page and a computation for malfunction prediction is also limited to that page. Therefore, according to the present embodiment, the amount of measurement data stored for malfunction prediction can be reduced as compared with the case of storing measurement data corresponding to all the pages, thereby suppressing a data communication load and a computation load for malfunction prediction. As a result, malfunction prediction information can be supplied to a user or serviceman while suppressing increase in cost.

Second Embodiment

In the first embodiment, malfunction prediction is started after the completion of printing of the last page and acquisition of measurement data. In contrast, in the present embodiment, malfunction prediction is started in the middle of printing of the last page. A difference between the present embodiment and the first embodiment will be mainly described and the same configuration and processing as those of the first embodiment will not be particularly described.

Figure 6:
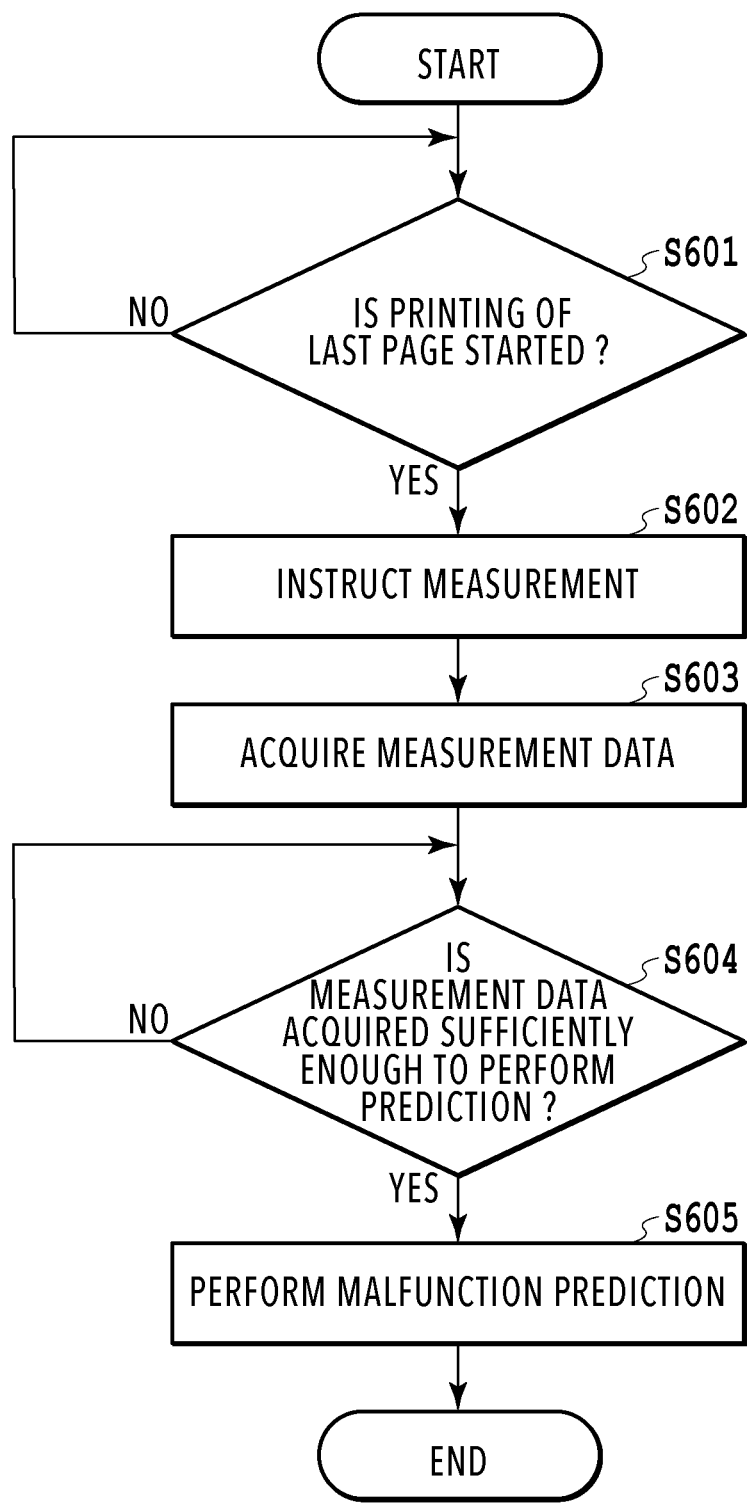
FIG. 6 is a flowchart showing processing of malfunction prediction.

FIG. 6 is a flowchart showing a series of processing for malfunction prediction of the overall control unit 100 in the present embodiment. The flowchart shows the processing for malfunction prediction after the image forming apparatus 10 starts continuous printing of N pages.

Since the processing from S601 to S603 is the same as the processing from S501 to S503, the description thereof is omitted. In S604, it is determined whether measurement data has been acquired sufficiently enough to start a computation for malfunction prediction. If measurement data has been acquired sufficiently enough to start a computation for malfunction prediction, the processing proceeds to S605, where the prediction unit 202 performs malfunction prediction. That is, in the present embodiment, the prediction unit 202 starts malfunction prediction while printing the last page.

Figure 7:
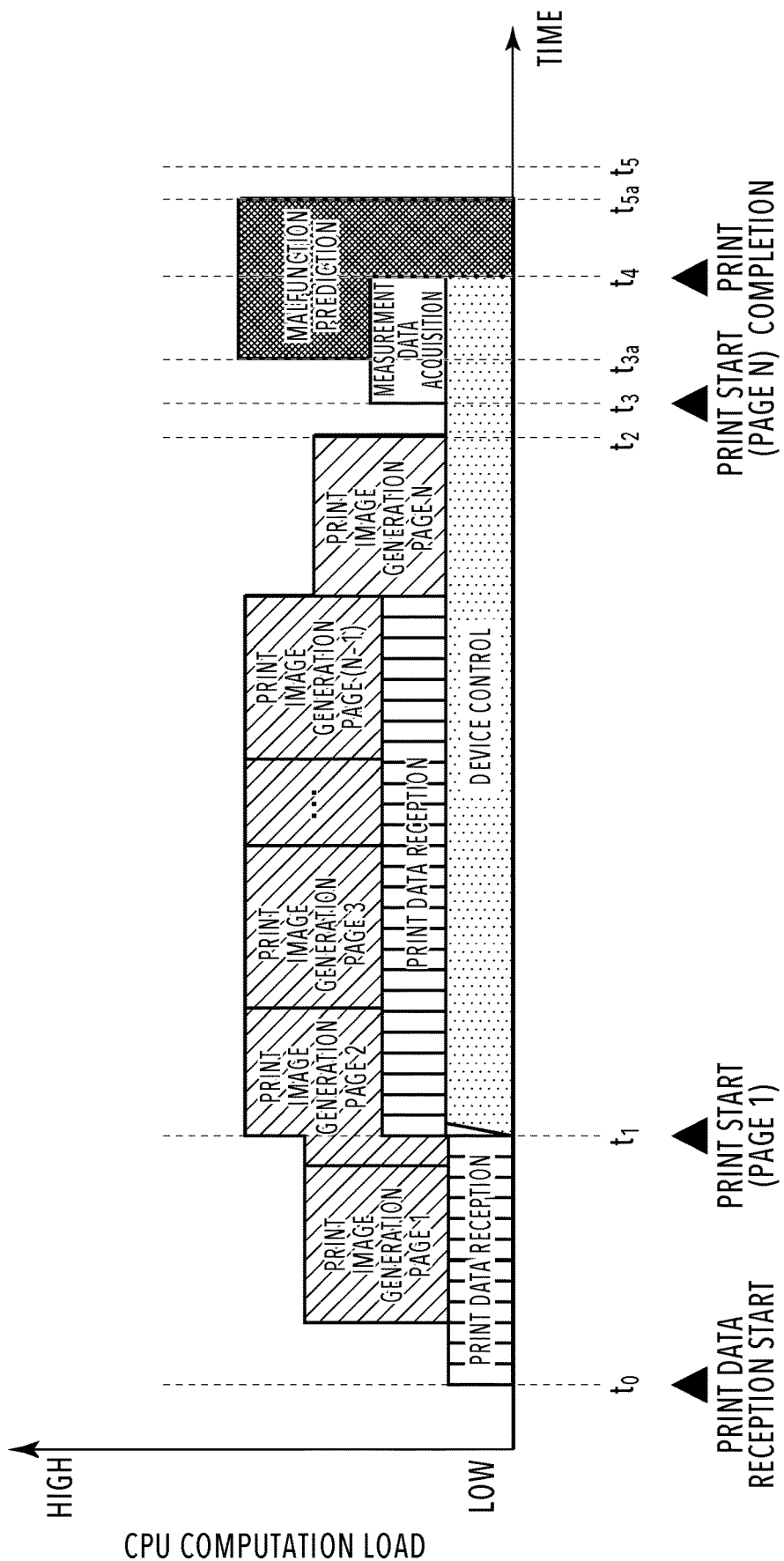
FIG. 7 is a diagram showing a time-series CPU load in continuous printing.

FIG. 7 is a diagram similar to FIG. 4, showing a time-series CPU load in the case of performing continuous printing of N pages in the present embodiment. At time $t_3$, acquisition of measurement data is started based on the start of printing of the last Nth page. Differently from the first embodiment, the prediction unit 202 starts malfunction prediction at time $t_{3\ a}$ at which measurement data is acquired sufficiently enough to start a computation for malfunction prediction.

As described above, according to the present embodiment, the data communication load and computation load for malfunction prediction can be reduced. In addition, the CPU load is reduced after time $t_2$ at which print image generation accompanied by a high CPU computation load is finished. Accordingly, malfunction prediction can be started earlier than the first embodiment, thereby using the CPU resources more effectively than the first embodiment.

Further, in the present embodiment, the completion time of malfunction prediction (time $t_{5\ a}$) can be earlier than that in the first embodiment (time $t_5$). After the completion of printing and a malfunction prediction computation, the image forming apparatus 10 may enter a low power consumption mode. In this case, since the time of entering the low power consumption mode in the present embodiment is earlier than that in the first embodiment, power consumption can be more reduced.

Part of measurement data that has been used for malfunction prediction processing and become unnecessary may be discarded at an arbitrary time. In the present embodiment, the prediction unit 202 performs malfunction prediction processing while acquiring measurement data from time $t_{3\ a}$ to time $t_4$. Therefore, by discarding part of measurement data as soon as the part of the measurement data has become unnecessary, the amount of measurement data stored in the measurement information storage unit 1003 can be reduced to an amount lower than the amount of data corresponding to one page.

Third Embodiment

In the embodiments described above, malfunction prediction is performed using measurement data during printing of the last Nth page. In contrast, in the present embodiment, malfunction prediction is performed using measurement data during printing of a page other than the last page. A difference between the present embodiment and the first embodiment will be mainly described and the same configuration and processing as those of the first embodiment will not be particularly described.

Figure 8:
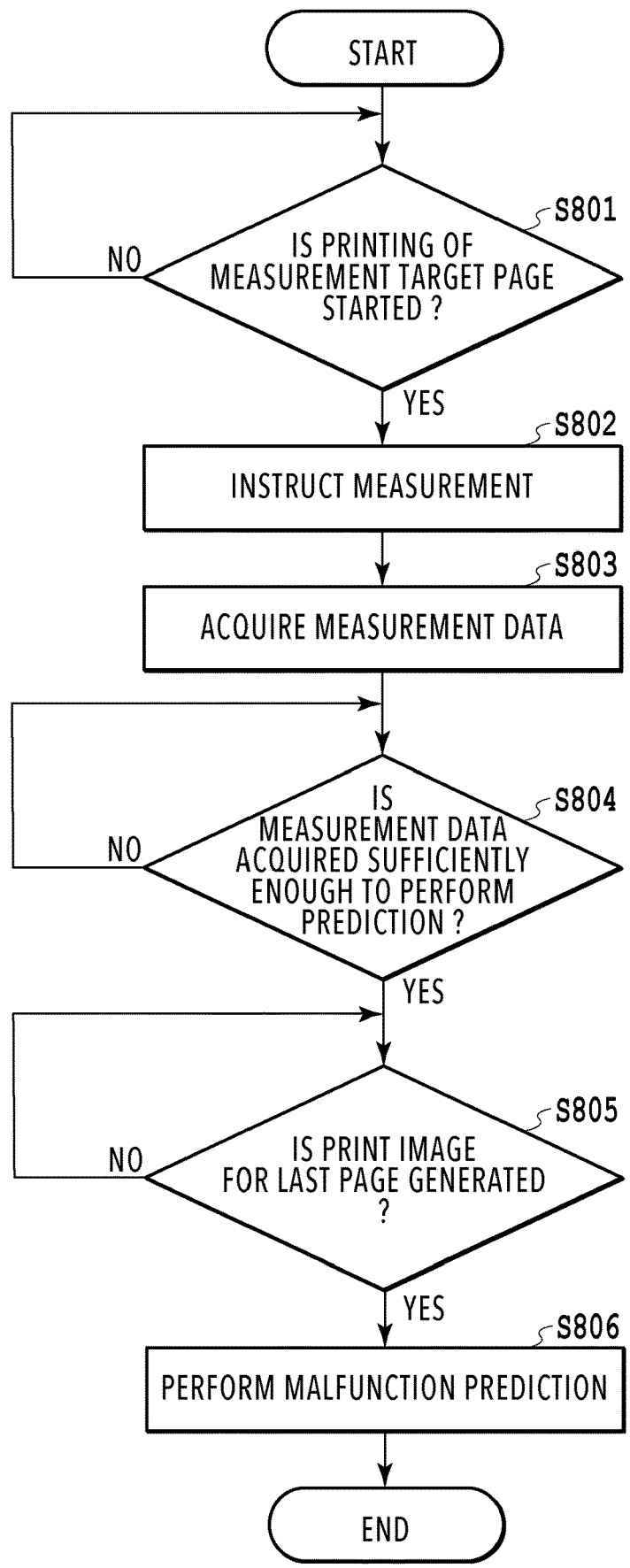
FIG. 8 is a flowchart showing processing of malfunction prediction.

FIG. 8 is a flowchart showing a series of processing for malfunction prediction of the overall control unit 100 in the present embodiment. The flowchart shows the processing after the image forming apparatus 10 starts continuous printing of N pages.

In S801, it is determined whether printing of a measurement target page is started. If printing of a measurement target page is started, the processing proceeds to S802. The measurement target page in the present embodiment is any page other than the last Nth page. The following description of the present embodiment is based on the assumption that the measurement target page is the (N−1)th page, which is a page immediately before the last page.

Since the processing from S802 to S804 is the same as the processing from S602 to S604, the description thereof is omitted. In S805, it is determined whether a print image for the last Nth page has been generated. Malfunction prediction is performed after the completion of print image generation accompanied by a high computation load. Thus, by determining in this step whether a print image for the last page has been generated, it is determined whether the generation of all print images for continuous printing has been completed. If the generation of a print image for the last page has been completed, the processing proceeds to S806, where the prediction unit 202 performs malfunction prediction using measurement data corresponding to the (N−1)th page, which is the measurement target page.

Figure 9:
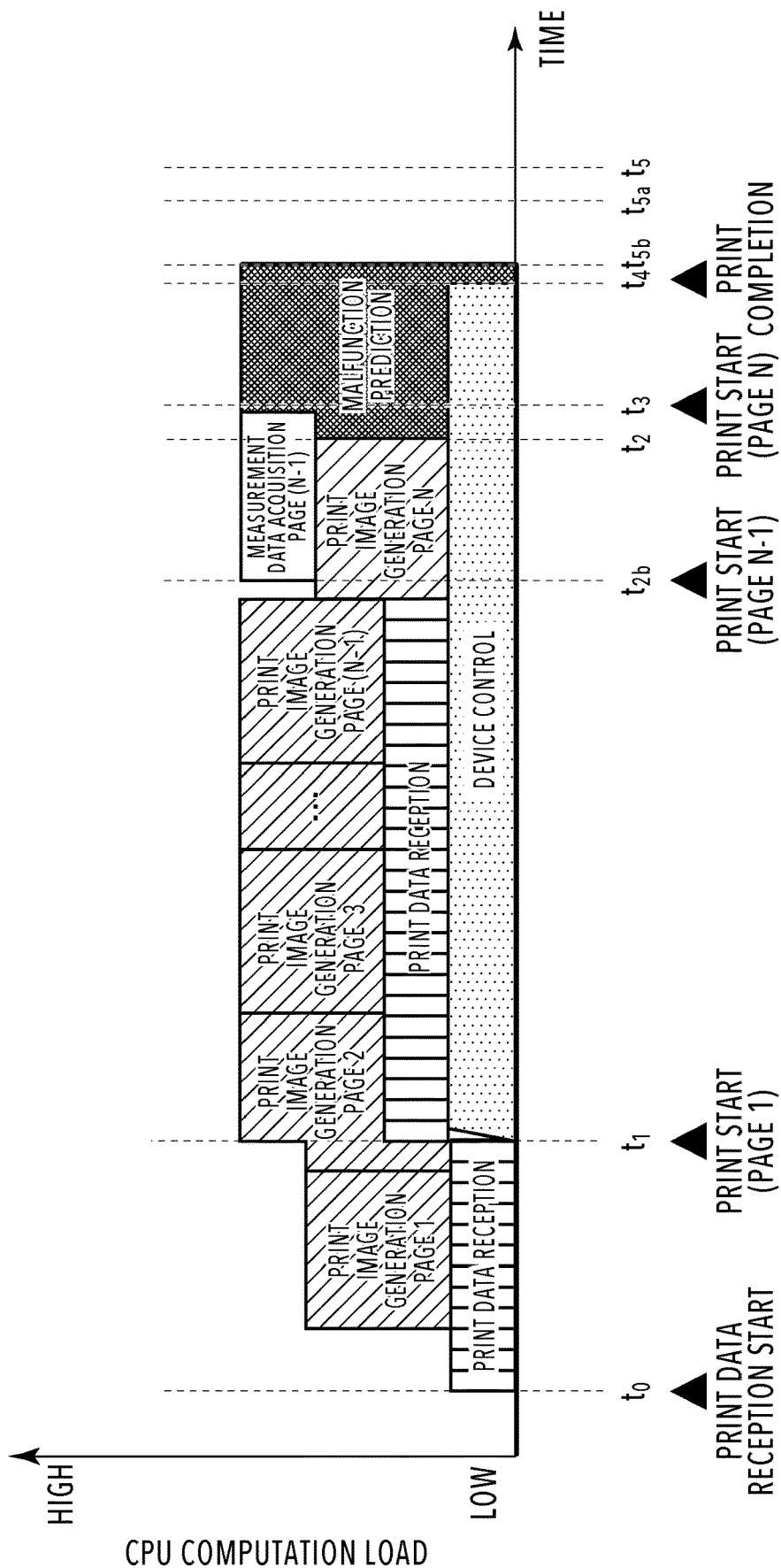
FIG. 9 is a diagram showing a time-series CPU load in continuous printing.

FIG. 9 is a diagram similar to FIG. 4, showing a time-series CPU load in the case of performing continuous printing of N pages in the present embodiment. From time $t_{2\ b}$, the start time of printing of a print image for the (N−1)th page, the measurement instruction unit 204 instructs the image forming units 101 to 104 to perform measurement, and each of the measurement units of the image forming units 101 to 104 measures the status of the image forming apparatus 10. At this time, the overall control unit 100 concurrently generates a print image for the Nth page.

In FIG. 9, at time $t_2$, the completion time of generation of the print image for the Nth page, measurement data corresponding to the measurement target page has been acquired sufficiently enough to start a malfunction prediction computation. Thus, the prediction unit 202 starts a malfunction prediction computation at time $t_2$. That is, in the present embodiment, measurement data at the time of printing of the last Nth page is not used for malfunction prediction. Accordingly, if measurement data corresponding to the measurement target page has been acquired sufficiently enough to start a malfunction prediction computation, the prediction unit 202 can start a malfunction prediction computation at time $t_2$. After time $t_2$, the CPU load is reduced since the generation of the print image for the last Nth page has been completed. Starting a malfunction prediction computation at time $t_2$ enables an effective use of the CPU resources. If measurement data is insufficient, the prediction unit 202 starts malfunction prediction at a time between time $t_2$ and time $t_3$, at which measurement data is acquired sufficiently enough to start a malfunction prediction computation.

As described above, according to the present embodiment, a data communication load and computation load in malfunction prediction can be suppressed. Further, since measurement data at the time of printing of the last Nth page is not used for malfunction prediction, the malfunction prediction computation can be completed earlier than the first and second embodiments.

Fourth Embodiment

In the embodiments described above, malfunction prediction is performed using a predetermined page in continuous printing of N pages as a measurement target page. In contrast, in the present embodiment, a measurement target page is determined for each print job.

A plurality of pages for which continuous printing is performed may include a page unsuitable for malfunction prediction such as a page including only one character. In the present embodiment, a page suitable for malfunction prediction is determined as a measurement target page.

Figure 10:
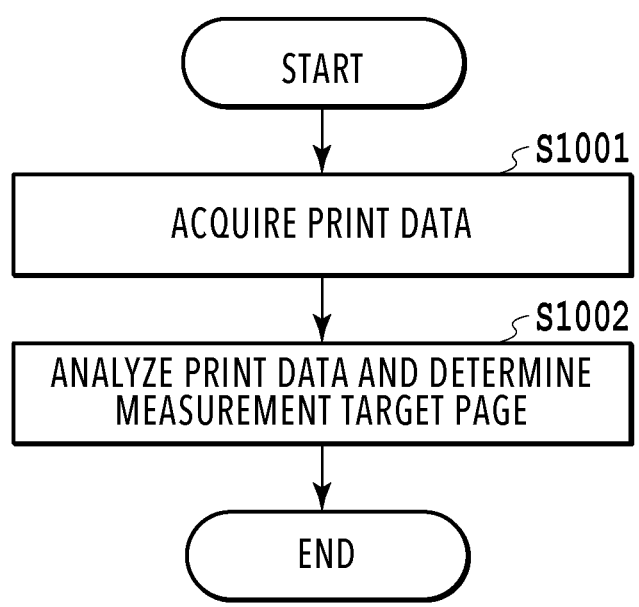
FIG. 10 is a flowchart showing processing of determining a measurement target page.

FIG. 10 is a flowchart showing a series of processing for determining a page suitable for malfunction prediction as a measurement target page. The overall control unit 100 of the present embodiment starts generating a print image after acquiring print data on all the pages. The flowchart shows processing from the acquisition of print data to the generation of a print image by the overall control unit 100.

In S1001, the determination unit 205 acquires print data on all the pages. In S1002, the determination unit 205 analyzes part of image information on each page while acquiring the print data. The determination unit 205 determines a page suitable for malfunction prediction out of pages in the acquired print data as a measurement target page, whereby the processing of the flowchart is finished.

A page suitable for malfunction prediction is a page including a number of characters and images out of pages included in the print data. For example, if the print data is PDL data such as PostScript, the data includes a character, figure, or image to be rendered. The determination unit 205 simply checks character and image data sizes in each page in print data while acquiring the print data and determines a page in which the sum of the amount of character data and the amount of image data is large as a page suitable for malfunction prediction.

After the processing of the flowchart is finished, a series of processing for malfunction prediction of the overall control unit 100 from the start of continuous printing is the same as that in the flowchart shown in FIG. 6 if the last page is determined as a measurement target page, and is the same as that in the flowchart shown in FIG. 8 if a page other than the last page is determined as a measurement target page.

The method of determining a page suitable for malfunction prediction is not limited to the method based on the sum of the amounts of character and image data and may be a method of interpreting part of PDL data and determining a page having the widest character and image area as a page suitable for malfunction prediction. Alternatively, a page suitable for malfunction prediction may be determined based on the amount of toner used, a character/image ratio or color ratio, a left- or right-skewed distribution of a print area, or the like.

Instead of selecting a page suitable for malfunction prediction, the determination unit 205 may determine a measurement target page in such a manner that the determination unit 205 does not select the page in a case where the measurement target page is unsuitable for malfunction prediction. For example, as a result of print data analysis, in a case where a measurement target page is a page unsuitable for malfunction prediction such as a blank page or a page with a small amount of character and image data, the determination unit 205 may determine a measurable page before or after that page as a measurement target page.

As described above, according to the present embodiment, the accuracy of malfunction prediction can be improved by determining a page suitable for malfunction prediction as a measurement target page. The processing of selecting a page suitable for malfunction prediction and determining the page as a measurement target page may be performed by the PC 13. For example, the PC 13 may determine a page suitable for malfunction prediction as a measurement target page at the time of generation of print data by the printer driver. The PC 13 may then transmit information for specifying the measurement target page in the print data to the image forming apparatus 10 together with the print data as attachment information of the print data. According to this method, since there is no need for the image forming apparatus 10 to determine a page suitable for malfunction prediction, a page suitable for malfunction prediction can be determined as a measurement target page without increasing the computation load of the image forming apparatus 10.

Fifth Embodiment

In the fourth embodiment, a page suitable for malfunction prediction is determined after completely acquiring print data. In the present embodiment, in a case where the image forming apparatus 10 performs printing while acquiring print data, a page suitable for malfunction prediction is determined while acquiring print data.

Figure 11:
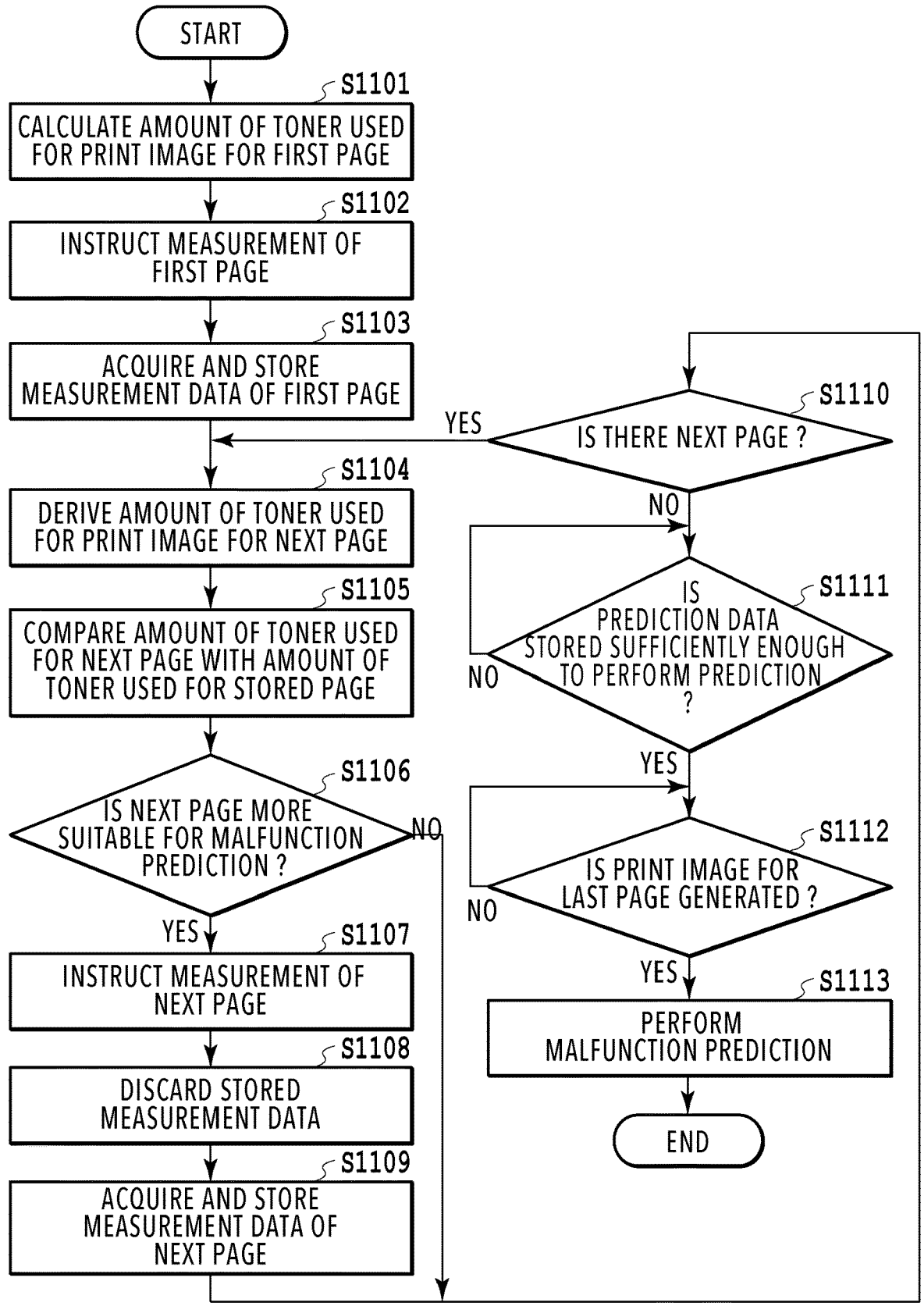
FIG. 11 is a flowchart showing processing of determining a measurement target page.

FIG. 11 is a flowchart showing a series of processing for malfunction prediction of the overall control unit 100 in the present embodiment. The flowchart shows processing after the overall control unit 100 acquires print data for continuous printing of N pages. The following description is based on the assumption that a page suitable for malfunction prediction is determined by the method of determining a page with a large amount of toner used in printing as a page suitable for malfunction prediction.

In S1101, after a print image for the first page is generated, the determination unit 205 derives the amount of toner used in printing of the print image for the first page. In S1102, the measurement instruction unit 204 instructs the image forming units 101 to 104 to measure the status of the image forming apparatus at the time of printing of the first page. In this step, since print images for the second and subsequent pages are not yet generated, the amounts of toner used for the second and subsequent pages cannot be derived. Since the first page has a probability of using a large amount of toner and being suitable for malfunction prediction, the measurement instruction unit 204 instructs measurement of the image forming apparatus 10 during printing of the first page.

In S1103, the acquisition unit 201 acquires measurement data and the measurement data management unit 203 stores measurement data corresponding to the first page in the measurement information storage unit 1003. In S1104, after a print image for the next page is generated, the determination unit 205 derives the amount of toner used in printing of the print image for the next page.

In S1105, the determination unit 205 compares the amount of toner used for the next page with the amount of toner used for a page measured to acquire measurement data stored in the measurement information storage unit 1003. For example, if the next page is the second page, measurement data stored in the measurement information storage unit 1003 is measurement data at the time of printing the first page. In this case, the amount of toner used for the first page is compared with the amount of toner used for the second page.

In S1106, the determination unit 205 determines whether the next page is suitable for measurement for malfunction prediction as a result of comparison in S1105. In the present embodiment, the determination unit 205 determines whether the amount of toner used for the next page is larger. If the next page is suitable for measurement for malfunction prediction (YES in S1106), the measurement instruction unit 204 instructs in S1107 the image forming units 101 to 104 to measure the status of the image forming apparatus 10 at the time of printing of the print image for the next page.

In S1108, the measurement data management unit 203 discards the previous measurement data stored in the measurement information storage unit 1003. Since it is determined in S1106 that the next page is suitable for malfunction prediction, the stored measurement data corresponding to the previous page becomes unnecessary. Thus, the currently stored measurement data is discarded for replacement with measurement data at the time of printing of the next page. Since the stored measurement data is replaced, measurement data stored in the measurement information storage unit 1003 can be measurement data corresponding to one page.

In S1109, the acquisition unit 201 acquires measurement data at the time of printing of the next page and the measurement data management unit 203 stores the measurement data in the measurement information storage unit 1003.

If the next page is not determined to be suitable for measurement for malfunction prediction (NO in S1106), or if the processing of S1109 is finished, the processing proceeds to S1110. If a page corresponding to the stored measurement data is more suitable for malfunction prediction than the next page, measurement during printing of the next page is not instructed. Accordingly, replacement of measurement data in the measurement information storage unit 1003 is not performed either.

In S1110, it is determined whether there is the next page. If there is the next page (YES in S1110), the processing returns to S1104 to repeat the processing from S1104 to S1109. If there is no next page (NO in S1110), the processing proceeds to S1111.

In this manner, in the process of sequential generation and printing of print images for a plurality of pages, measurement data corresponding to a page suitable for malfunction prediction is overwritten and stored. A print image for the page corresponding to the stored measurement data is compared with a print image generated next. If the print image generated next is more suitable for malfunction prediction, measurement data corresponding to the page is overwritten for update. As a result, the stored measurement data is measurement data corresponding to a page suitable for malfunction prediction.

Since the processing from S1111 to S1112 is the same as the processing from S804 to S805, the description thereof is omitted. If the last Nth page is suitable for malfunction prediction, the completion of printing of the Nth page is waited for.

In S1113, the prediction unit 202 performs malfunction prediction based on measurement data currently stored in the measurement information storage unit 1003. That is, the measurement data stored in the measurement information storage unit 1003 in this step is measurement data corresponding to a page suitable for malfunction prediction out of N pages subjected to continuous printing. Therefore, the prediction unit 202 can perform malfunction prediction using measurement data suitable for malfunction prediction, namely the measurement data stored in the measurement information storage unit 1003.

In the present embodiment, a page suitable for malfunction prediction is determined using the amount of toner used. In the case of using a different determination method, feature amounts of print images to be used for the determination method are determined in S1101 and S1104.

Figure 12:
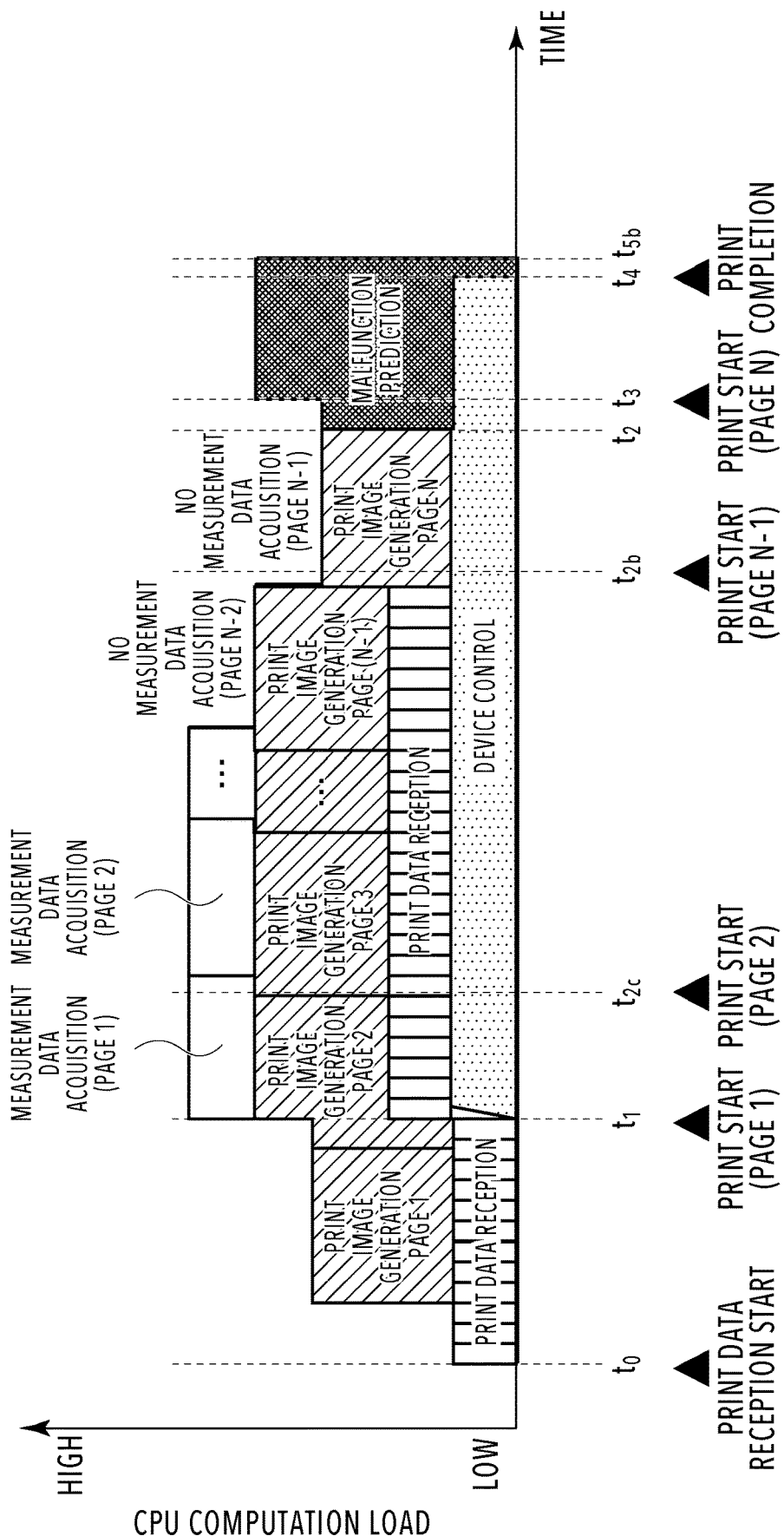
FIG. 12 is a diagram showing a time-series CPU load in continuous printing.

FIG. 12 is a diagram similar to FIG. 4, showing a time-series CPU load in the case of performing continuous printing of N pages in the present embodiment. First, at time $t_0$, the overall control unit 100 starts receiving print data. Between time to and time $t_1$, the overall control unit 100 generates a print image for the first page. The amount of toner used in the case of printing the first page is derived from the print image for the first page.

At time $t_1$, printing of the first page is started. The CPU load occurs since the measurement instruction unit 204 instructs the image forming units 101 to 104 to measure the status of the image forming apparatus 10 during printing of the first page and the acquisition unit 201 acquires measurement data.

At time $t_{2\_c}$, the generation of a print image for the second page is completed. Thus, the determination unit 205 compares the amount of toner used for the first page with the amount of toner used for the second page. Since the amount of toner used for the second page is larger in the example illustrated, the measurement instruction unit 204 instructs the image forming units 101 to 104 to perform measurement during printing of the second page and the acquisition unit 201 acquires measurement data during printing of the second page, with the result that the CPU load occurs.

Since it is determined that the amount of toner used for the previous page is larger, measurement of the status of the image forming apparatus 10 during printing of the (N−2)th page, the (N−1)th page, and the Nth page is not instructed. Therefore, there is no CPU load for instructing measurement and acquiring measurement data during printing of the (N−2)th page, the (N−1)th page, and the Nth page.

At time $t_2$, the overall control unit 100 completes the generation of a print image for the last Nth page. Since measurement data is stored in the measurement information storage unit 1003 sufficiently enough to perform malfunction prediction at time $t_2$, the prediction unit 202 starts a malfunction prediction computation. In a case where measurement data is not acquired, malfunction prediction is started as soon as measurement data is acquired.

In the present embodiment, a print image suitable for malfunction prediction is determined by the method of determining a page with a large amount of toner used as a page suitable for malfunction prediction. However, the method is not limited to this. For example, a print image suitable for malfunction prediction may be determined based on a character/image ratio, a color ratio, or the size or distribution of a print area.

In the present embodiment, a page suitable for malfunction prediction is determined from N pages for which continuous printing is performed. However, a page suitable for malfunction prediction may be determined from pages other than the Nth page. By excluding the Nth page, the Nth page is not determined as a measurement target page. Therefore, after the generation of a print image for the Nth page, malfunction prediction can be performed as soon as measurement data is acquired sufficiently enough to perform a prediction computation.

As described above, according to the present embodiment, malfunction prediction can be performed using measurement data during printing of a page suitable for malfunction prediction out of a plurality of pages for which continuous printing is performed, without increasing a storage area for storing measurement data.

Sixth Embodiment

In the embodiments described above, measurement data used for malfunction prediction is data corresponding to one page. In contrast, in the present embodiment, malfunction prediction is performed based on measurement data during printing of two or more pages out of N pages for which continuous printing is performed.

For example, the measurement instruction unit 204 instructs measurement of the status of the image forming apparatus 10 during printing of each of the first, middle, and last pages out of the N pages for which continuous printing is performed. Measurement data corresponding to each page is stored in the measurement information storage unit 1003. After the completion of printing of the last page, the prediction unit 202 performs malfunction prediction using the stored measurement data corresponding to the three pages.

According to the present embodiment, since malfunction prediction can be performed based on measurement data during printing of the three page, namely the first and last pages of printing and the middle page in the stable operation, the accuracy of prediction can be further improved.

Alternatively, two pages, the first and last pages, or a plurality of middle pages may be measurement target pages. Also in the embodiments of performing malfunction prediction using measurement data corresponding to a page suitable for malfunction prediction such as the fourth and fifth embodiments, measurement data used for malfunction prediction may be measurement data corresponding to two or more pages. For example, measurement data corresponding to the two most suitable pages for malfunction prediction may be stored such that the prediction unit 202 performs malfunction prediction using the measurement data.

The number of pages corresponding to measurement data to be used for malfunction prediction may be determined according to the available storage capacity of the measurement information storage unit 1003 or the computation ability of the CPU 1001. The measurement instruction unit 204 may instruct measurement during printing of a plurality of pages and the measurement data management unit 203 may store measurement data corresponding to the plurality of pages until malfunction prediction. The prediction unit 202 may assign priorities to the stored measurement data and perform malfunction prediction using measurement data to the extent that the CPU 1001 can process based on the priorities.

Seventh Embodiment

In the present embodiment, each of the image forming units 101 to 104 comprises a temporary storage unit. In the fifth or sixth embodiment described above, the acquisition unit 201 acquires measurement data each time the image forming units 101 to 104 perform measurement. In contrast, in the present embodiment, the acquisition unit 201 acquires measurement data from the temporary storage unit of each of the image forming units 101 to 104 only once before performing malfunction prediction.

Figure 13:
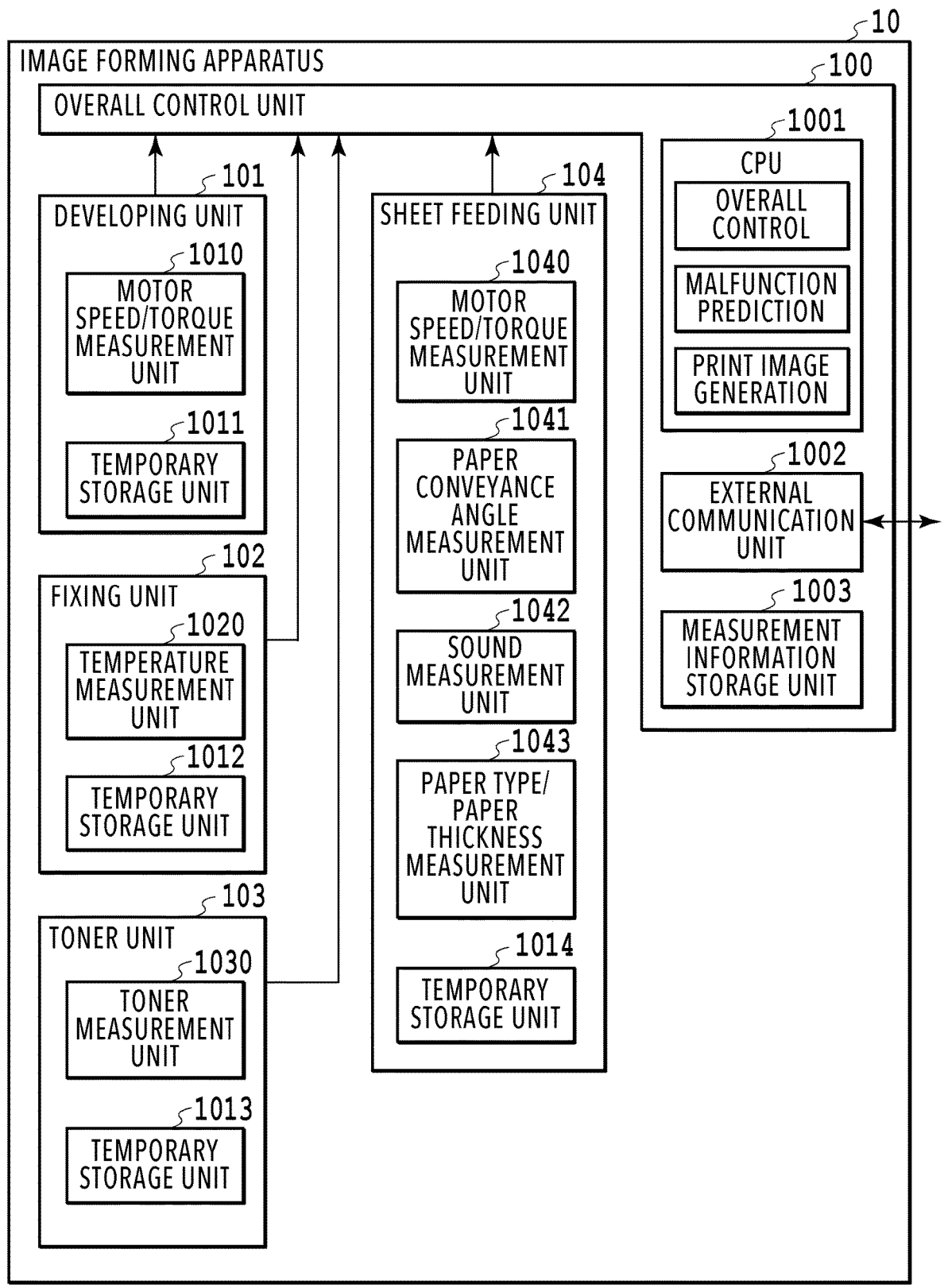
FIG. 13 is a diagram showing an example of a configuration of an image forming apparatus.

FIG. 13 is a diagram showing a configuration of the image forming apparatus 10 in the present embodiment. The same reference numerals are assigned to the same features as those of the first embodiment and the description thereof is omitted. In the present embodiment, the developing unit 101 comprises a temporary storage unit 1011, the fixing unit 102 comprises a temporary storage unit 1012, the toner unit 103 comprises a temporary storage unit 1013, and the sheet feeding unit 104 comprises a temporary storage unit 1014.

An example of a series of processing for malfunction prediction by the overall control unit 100 of the present embodiment will be described with reference to FIG. 11 again. In S1103 or S1109, measurement data that is a result of measurement by the measurement units of the image forming units 101 to 104 is stored in the respective temporary storage units 1011 to 1014 of the image forming units 101 to 104 which have performed measurement to obtain the measurement data. In S1108, if measurement data is stored in the temporary storage units 1011 to 1014 of the image forming units 101 to 104, the stored measurement data is discarded and then measurement data is stored in S1109.

In S1111 before the start of malfunction prediction, the step does not start until the measurement data is stored in the temporary storage units 1011 to 1014 of the image forming units 101 to 104. After measurement data is stored in the temporary storage units 1011 to 1014, the acquisition unit 201 acquires the measurement data from the temporary storage units 1011 to 1014. After that, it is determined whether the measurement data has been stored in (transferred to) the measurement information storage unit 1003 sufficiently enough to perform prediction. Since the other steps are the same as those in the fifth embodiment, the description thereof is omitted.

In a case where measurement data used for malfunction prediction corresponds to a plurality of pages like the sixth embodiment, measurement data obtained through measurement by the image forming units 101 to 104 is stored in the respective temporary storage units 1011 to 1014 of the units which have performed the measurement. The measurement data in the temporary storage units 1011 to 1014 is collectively transmitted to the measurement information storage unit 1003 before malfunction prediction.

As described above, according to the present embodiment, the number of transfers of measurement data from the image forming units 101 to 104 to the measurement information storage unit 1003 can be reduced. In addition, the data transmission band to the measurement information storage unit 1003 of the overall control unit can also be reduced.

Eighth Embodiment

In the present embodiment, a measurement target page for obtaining measurement data is determined by a different method. In the embodiments described above, a measurement target page is determined from a plurality of pages for which continuous printing is performed. The continuous printing is performed by, for example, a plurality of page print commands in a single print job. In the present embodiment, a measurement target page is determined considering not a single print job but a plurality of print jobs as a single print job (i.e., continuous printing).

Figure 14:
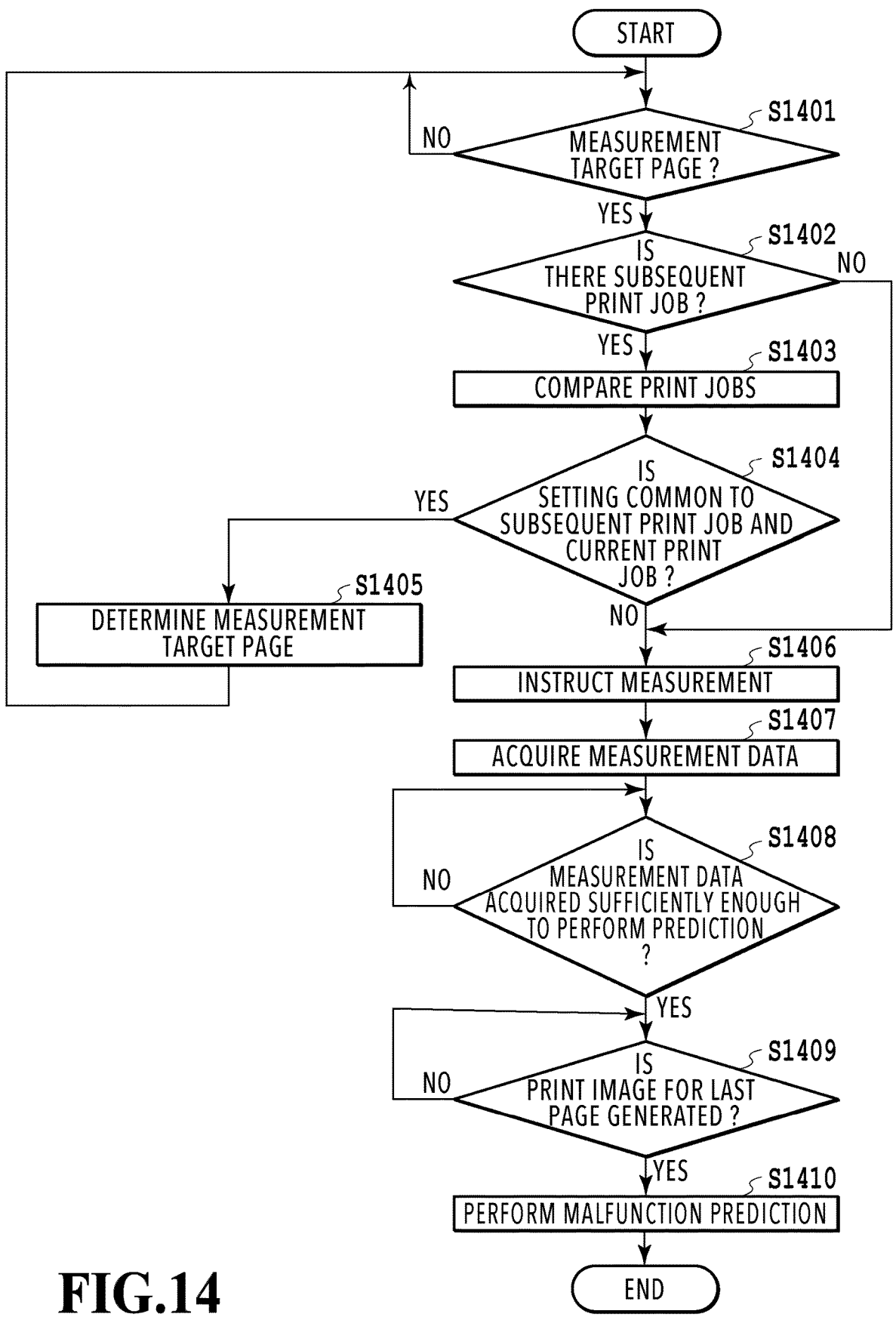
FIG. 14 is a flowchart showing processing of determining a measurement target page.

FIG. 14 is a flowchart showing a series of processing for malfunction prediction of the overall control unit 100 in the present embodiment. The flowchart shows a series of processing for malfunction prediction in the present embodiment in a case where a measurement target page has been determined in advance like the first to third embodiments.

In S1401, it is determined whether printing of the measurement target page is started. For example, it is assumed that the (N−1)th page out of a plurality of pages (N pages) for which continuous printing is performed has been determined as the measurement target page. If printing of the measurement target page is started, the processing proceeds to S1402.

In S1402, it is determined whether there is a subsequent print job. If there is a subsequent print job (YES in S1402), the comparison unit 206 compares in S1403 settings of the subsequent print job with settings of a currently processed print job. In S1404, as a result of comparison, it is determined whether predetermined setting is common to the subsequent print job and the current continuous printing job. The predetermined setting is, for example, the type of paper or printing (such as single-sided printing or double-sided printing).

If the setting is common to the jobs (YES in S1404), the determination unit 205 performs processing in S1405 considering printing by the current print job and by the subsequent print job as printing by a single print job. That is, the determination unit 205 performs processing of determining a measurement target page considering printing by the current print job and by the subsequent print job as a single continuous printing process. In this flow, the (N−1)th page for continuous printing has been determined as the measurement target page. Accordingly, the determination unit 205 determines the (N−1)th page in printing by the subsequent print job as the measurement target page. The processing from S1401 to S1405 is performed also in the subsequent print job. Since the processing from S1406 to S1410 is the same as the processing from S802 to S806, the description thereof is omitted.

In S1407, if there is a subsequent print job having a setting common to the current print job, the acquisition unit 201 acquires measurement data corresponding to a measurement target page in the case of considering the current print job and the subsequent print job as a single print job.

In the embodiment of determining a measurement target page in the case of acquiring a print job including print data like the fourth embodiment, it is determined whether there is a subsequent print job having a common predetermined setting at the time of acquiring the print job. In a case where there is a subsequent print job having a common predetermined setting, a measurement target page may be determined considering the subsequent print job and the current job as a single print job.

In the embodiment of determining a measurement target page while performing printing like the fifth embodiment, it is determined whether there is a subsequent print job having a common predetermined setting at the time of generating a print image for the Nth page, the last page of a print job currently subjected to print processing. In a case where there is a subsequent print job having a common predetermined setting, the subsequent processing is performed considering the current print job and the subsequent print job as a single print job. That is, at the end of continuous printing by the current print job, the prediction unit 202 does not perform malfunction prediction. After a print image for the subsequent print job is generated, processing for determining whether there is a page suitable for malfunction prediction is further performed. Also in this case, it is further determined whether there is a subsequent print job having a common predetermined setting at the time of generating an image for the last page of the subsequent print job. Measurement data corresponding to a page suitable for malfunction prediction over a plurality of print jobs is used for malfunction prediction.

As described above, according to the present embodiment, processing is performed considering the subsequent print job and the current print job as a single job. Therefore, in a case where print jobs are continuous, malfunction prediction processing can be prevented from being performed between the print jobs. As a result, a waiting time for malfunction prediction in the subsequent print job can be reduced.

Other Embodiments

In the embodiments described above, the image forming apparatus 10 performs malfunction prediction. However, malfunction prediction may be performed by the external server 11 having the same functions as those of the respective units for malfunction prediction shown in FIG. 2. For example, the image forming apparatus may transmit measurement data to the external server 11 using the external communication unit 1002. The external server 11 may comprise at least the acquisition unit 201 and the prediction unit 202 such that the external server 11 acquires the transmitted measurement data and performs malfunction prediction.

According to the technique of this disclosure, the processing load in malfunction prediction can be reduced.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-129375, filed Jul. 11, 2019, which is hereby incorporated by reference wherein in its entirety.

What is claimed is:

1. A control apparatus comprising:
one or more first memories including a set of first instructions stored thereon; and
one or more first processors that execute the set of first instructions to cause the control apparatus to function as:
an acquisition unit configured to acquire measurement data in continuous printing in which print images corresponding to a plurality of pages generated based on print data are continuously printed, the measurement data being data obtained by measuring a status of an image forming apparatus while the image forming apparatus is printing a print image for at least one measurement target page out of the plurality of pages without using a rest of the plurality of pages as measurement target pages; and
a prediction unit configured to perform processing of predicting a possibility of a malfunction of the image forming apparatus using the measurement data,
wherein the prediction unit starts the processing while the image forming apparatus is printing a print image for the measurement target page.

2. The control apparatus according to claim 1, wherein the one or more first processors execute the set of first instructions to cause the control apparatus to further function as a measurement instruction unit configured to instruct a measurement unit of the image forming apparatus to measure the status of the image forming apparatus while the image forming apparatus is printing the print image for the measurement target page, and
wherein the acquisition unit acquires the measurement data obtained according to an instruction from the measurement instruction unit.

3. The control apparatus according to claim 1, wherein the measurement target page is a last page of the plurality of pages.

4. The control apparatus according to claim 1, wherein the measurement target page is two or more pages out of the plurality of pages, and
the prediction unit performs the processing using the measurement data corresponding to the two or more pages.

5. The control apparatus according to claim 4, wherein the two or more pages include at least a first page and a last page of the plurality of pages.

6. The control apparatus according to claim 3, wherein the prediction unit starts the processing while the image forming apparatus is printing a print image for the last page.

7. The control apparatus according to claim 1, wherein the measurement target page is a page other than a last page out of the plurality of pages, and
the prediction unit starts the processing after a print image for the last page is generated.

8. The control apparatus according to claim 1, further comprising a determination unit configured to determine the measurement target page from the plurality of pages based on the print data.

9. The control apparatus according to claim 1, wherein the one or more first processors execute the set of first instructions to cause the control apparatus to further function as:

a determination unit configured to, each time a print image for one page out of the plurality of pages is generated, compare a first print image, which is the print image for the one page, with a second print image, which is a print image for a current measurement target page measured to obtain the measurement data currently stored, and determine the one page corresponding to the first print image as a new measurement target page in a case where the first print image is more suitable for the processing than the second print image; and
a management unit configured to, in a case where the acquisition unit acquires the measurement data corresponding to the measurement target page and different measurement data is already stored, replace the different measurement data with the measurement data acquired by the acquisition unit, and
wherein in a case where print images for all of the plurality of pages are generated, or in a case where print images for all of the plurality of pages are printed, the prediction unit performs the processing using the measurement data currently stored.

10. The control apparatus according to claim 8, wherein the determination unit determines the measurement target page based on an amount of toner used in a case where the image forming apparatus performs printing.

11. The control apparatus according to claim 1, wherein the one or more first processors execute the set of first instructions to cause the control apparatus to further function as a comparison unit configured to, in a case where there is a second print job subsequent to a first print job, compare settings of the first print job with settings of the second print job, and
wherein as a result of the comparison, in a case where a predetermined setting is common to the first print job and the second print job, the acquisition unit acquires the measurement data corresponding to the measurement target page considering the first print job and the second print job as a single print job.

12. The control apparatus according to claim 1, wherein in a case where part of the measurement data stored in a storage unit becomes unnecessary while the processing is performed, the prediction unit discards the unnecessary part of the measurement data.

13. The control apparatus according to claim 1, wherein as a result of the processing by the prediction unit, in a case where the image forming apparatus has a high possibility of a malfunction, a predetermined notification is made.

14. The control apparatus according to claim 1, wherein before the processing is started, the acquisition unit acquires the measurement data from temporary storage units provided in respective image forming units in the image forming apparatus and configured to store the measurement data from the respective image forming units during printing.

15. The control apparatus according to claim 1, connected to the image forming apparatus via a network.

16. An image forming apparatus comprising:
the control apparatus according to claim 1;
one or more second memories including a set of second instructions stored thereon; and
one or more second processors that execute the set of second instructions to cause the image forming apparatus to function as:
an image forming unit configured to perform printing based on a print image; and a measurement unit configured to measure the status of the image forming apparatus during printing for obtaining the measurement data.

17. The image forming apparatus according to claim 16, wherein the measurement unit measures at least one of a motor speed, a torque of a motor, a temperature, a remaining amount of toner, an angle of a conveyed sheet, and sound.

18. An information processing apparatus connected to a control apparatus comprising:
one or more first memories including a set of first instructions stored thereon; and
one or more first processors that execute the set of first instructions to cause the control apparatus to function as:
an acquisition unit configured to acquire measurement data in continuous printing in which print images corresponding to a plurality of pages generated based on print data are continuously printed, the measurement data being data obtained by measuring a status of an image forming apparatus while the image forming apparatus is printing a print image for at least one measurement target page out of the plurality of pages without using a rest of the plurality of pages as measurement target pages; and
a prediction unit configured to perform processing of predicting a possibility of a malfunction of the image forming apparatus using the measurement data,
wherein the prediction unit starts the processing while the image forming apparatus is printing a print image for the measurement target page, and
wherein the information processing apparatus comprises:
one or more second memories including a set of second instructions stored thereon; and
one or more second processors that execute the set of second instructions to cause the information processing apparatus to function as:
a generation unit configured to generate the print image;
a determination unit configured to determine a page suitable for the processing out of the plurality of pages as the measurement target page in generation of the print data; and
a transmission unit configured to transmit the print data and information for specifying the measurement target page to the control apparatus.

19. A control method comprising:
an acquisition step of acquiring measurement data in continuous printing in which print images corresponding to a plurality of pages generated based on print data are continuously printed, the measurement data being data obtained by measuring a status of an image forming apparatus while the image forming apparatus is printing a print image for at least one measurement target page out of the plurality of pages without using a rest of the plurality of pages as measurement target pages; and
a prediction step of performing processing of predicting a possibility of a malfunction of the image forming apparatus using the measurement data,
wherein the prediction step starts the processing while the image forming apparatus is printing a print image for the measurement target page.

20. A non-transitory computer readable storage medium storing a program which causes a computer to perform a control method comprising:
an acquisition step of acquiring measurement data in continuous printing in which print images corresponding to a plurality of pages generated based on print data are continuously printed, the measurement data being data obtained by measuring a status of an image forming apparatus while the image forming apparatus is printing a print image for at least one measurement target page out of the plurality of pages without using a rest of the plurality of pages as measurement target pages; and
a prediction step of performing processing of predicting a possibility of a malfunction of the image forming apparatus using the measurement data,
wherein the prediction step starts the processing while the image forming apparatus is printing a print image for the measurement target page.

* * * * *